US012650152B2

(12) United States Patent
Briane et al.

(10) Patent No.: US 12,650,152 B2
(45) Date of Patent: Jun. 9, 2026

(54) COVER FOR A GEAR MOTOR UNIT FOR AN ELECTRIC DISC BRAKE ACTUATOR, AND GEAR MOTOR UNIT COMPRISING SUCH A COVER

(71) Applicant: ASTEMO FRANCE, Drancy (FR)

(72) Inventors: Nicolas Briane, Trelaze (FR); Gaëtan Quazuguel, Pantin (FR); Jordane Lenoir, Angers (FR)

(73) Assignee: ASTEMO FRANCE, Drancy (FR)

( * ) Notice: Subject to any disclaimer, the term of this patent is extended or adjusted under 35 U.S.C. 154(b) by 376 days.

(21) Appl. No.: 18/554,662

(22) PCT Filed: Apr. 8, 2022

(86) PCT No.: PCT/EP2022/059369
§ 371 (c)(1),
(2) Date: Oct. 10, 2023

(87) PCT Pub. No.: WO2022/218839
PCT Pub. Date: Oct. 20, 2022

(65) Prior Publication Data
US 2024/0200623 A1 Jun. 20, 2024

(30) Foreign Application Priority Data
Apr. 12, 2021 (FR) ...................................... 2103756

(51) Int. Cl.
*F16D 65/18* (2006.01)
*B60T 13/74* (2006.01)
(Continued)

(52) U.S. Cl.
CPC ........ *F16D 65/0081* (2013.01); *B60T 13/746* (2013.01); *F16D 65/18* (2013.01); (Continued)

(58) Field of Classification Search
CPC .. F16D 65/0006; F16D 65/0081; F16D 65/18; F16D 2121/24; F16D 2125/50; F16D 2250/0084; F16D 55/226; B60T 13/746
(Continued)

(56) References Cited

U.S. PATENT DOCUMENTS 4,444,071 A 4/1984 Guichard
7,566,998 B2 * 7/2009 Winkler ................... H02K 5/24
310/51
(Continued)

FOREIGN PATENT DOCUMENTS

EP 2824785 A1 1/2015
FR 3053422 A1 1/2018
FR 3074757 A1 6/2019

OTHER PUBLICATIONS

International Search Report and Written Opinion received for PCT/EP2022/059369, mailed Jul. 12, 2022.
(Continued)

*Primary Examiner* — Christopher P Schwartz
(74) *Attorney, Agent, or Firm* — Greer, Burns & Crain, Ltd

(57) ABSTRACT

A cover for a gear motor unit, including a housing enclosing an electric motor and a gear mechanism which includes pinions that mesh with the inner surface of a rotationally fixed ring gear having a free edge. The cover also includes an axial projection, in particular, an internal skirt, capable of being positioned so as to at least partially bear against the free edge, the projection having, on a free end opposite the free edge of the ring, at least one elastically deformable element capable of at least partially bearing against the free edge of the ring so as to hold said crown in the housing in an axial direction of the ring.

14 Claims, 3 Drawing Sheets

(51) Int. Cl.

| | |
|---|---|
| *F16D 55/226* | (2006.01) |
| *F16D 65/00* | (2006.01) |
| *F16D 121/24* | (2012.01) |
| *F16D 125/50* | (2012.01) |

(52) U.S. Cl.
CPC ...... *F16D 2121/24* (2013.01); *F16D 2125/50* (2013.01); *F16D 2250/0084* (2013.01)

(58) Field of Classification Search
USPC .................................... 188/156–164; 310/51
See application file for complete search history.

(56) References Cited

U.S. PATENT DOCUMENTS

| | | | |
|---|---|---|---|
| 8,790,208 B2 | 7/2014 | Poertzgen et al. | |
| 2006/0255666 A1* | 11/2006 | Williams ................. | H02K 5/24 |
| | | | 310/51 |
| 2015/0330467 A1 | 11/2015 | Bourlon | |
| 2017/0343065 A1* | 11/2017 | Okada ..................... | F16D 65/18 |
| 2019/0229587 A1 | 7/2019 | Watrin et al. | |
| 2019/0252944 A1 | 8/2019 | Watrin et al. | |
| 2021/0071727 A1* | 3/2021 | Jang ..................... | B60T 13/741 |
| 2024/0109527 A1* | 4/2024 | Lee ....................... | F16H 57/029 |
| 2024/0401689 A1* | 12/2024 | Briane ................. | F16H 57/028 |

OTHER PUBLICATIONS

French Search Report received for Application No. 2103756, dated Oct. 18, 2021.

\* cited by examiner

[Fig. 1]
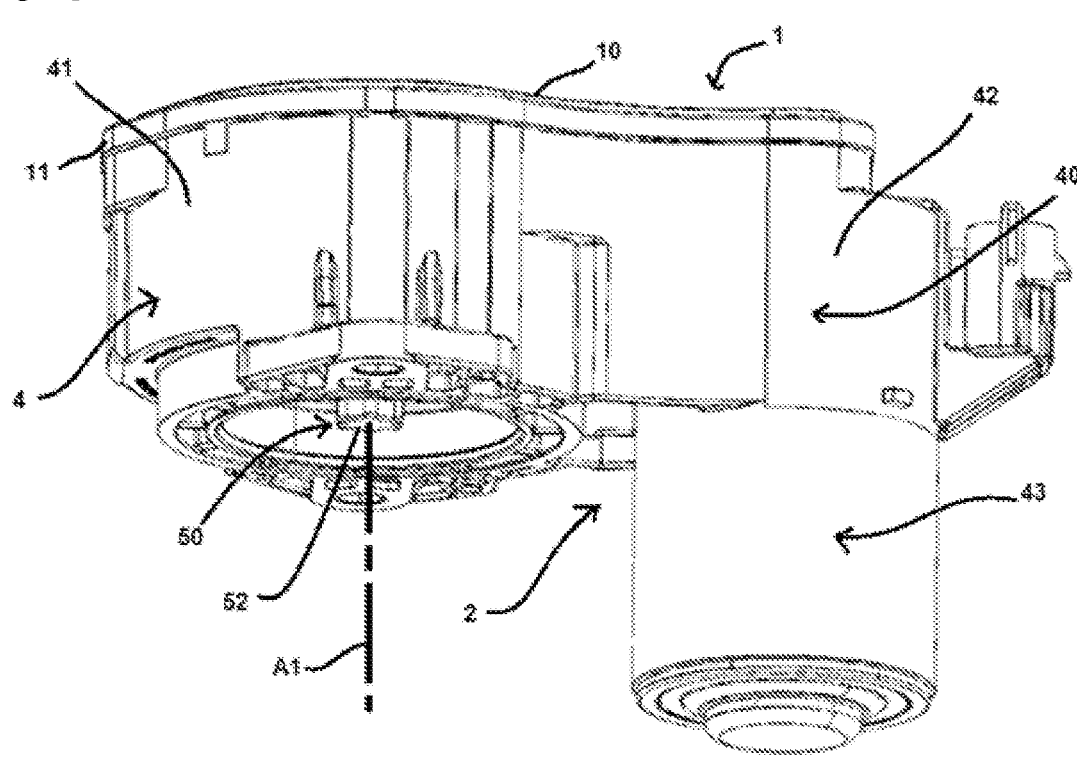
[Fig. 2]
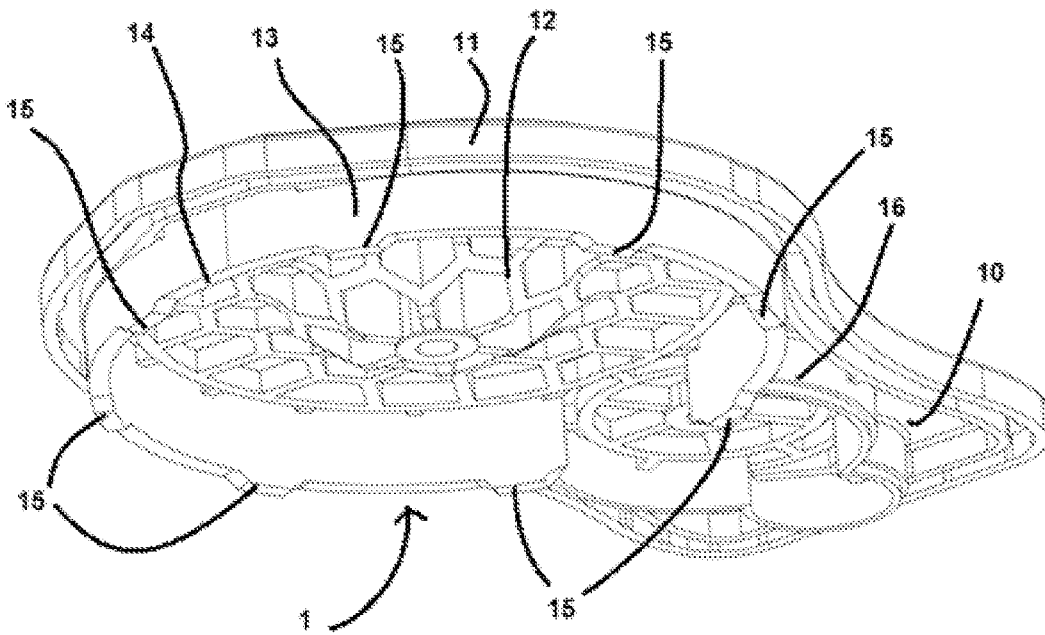

[Fig. 3]
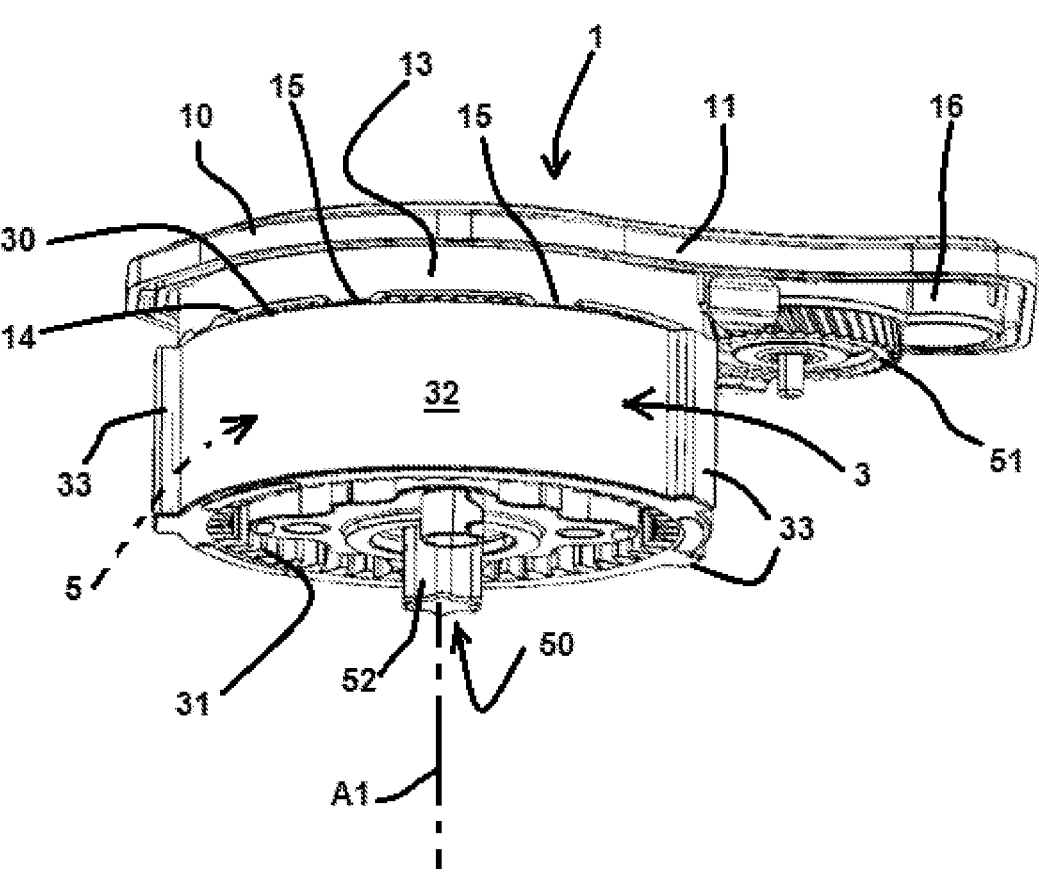

[Fig. 4]
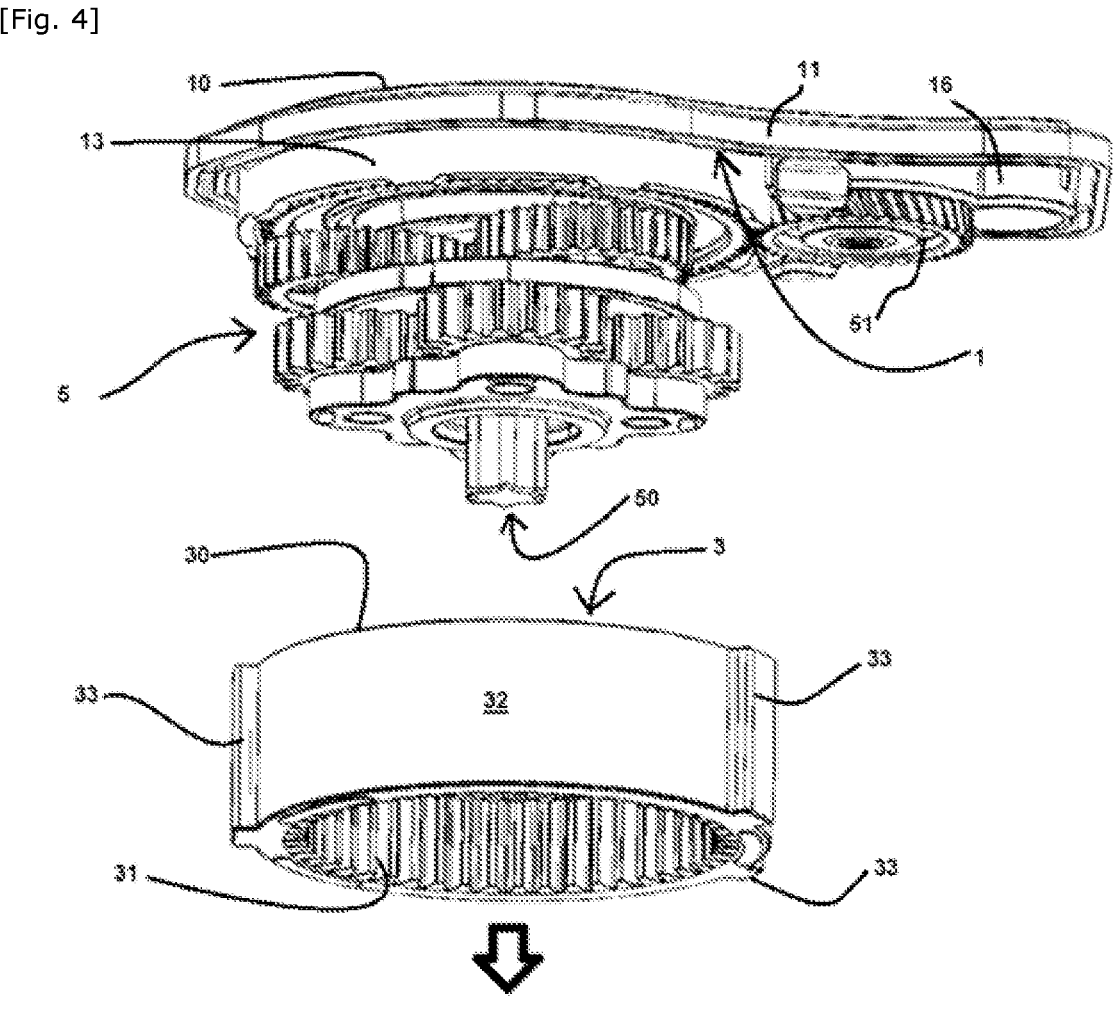

COVER FOR A GEAR MOTOR UNIT FOR AN ELECTRIC DISC BRAKE ACTUATOR, AND GEAR MOTOR UNIT COMPRISING SUCH A COVER

BACKGROUND

The invention relates to an electric motor gear unit mounted at the end of a disc brake actuator, which comprises a motor mounted cantilevered, parallel to the output of the reduction gear and on the same side.

In the field of brakes, for the automobile industry in general, and more particularly disc brakes, it has become common to install an electric actuator directly on the brake. This actuator is generally used for the parking and emergency brake function, but sometimes also as a service brake.

In general, this actuator is motorized by an electric motor gear unit (MGU), which comprises a drive device (or motor) and a transmission device (or reduction gear mechanism), the two devices being interconnected (the motor actuating the transmission device) and being enclosed in a protective casing comprising on the one hand an open housing and on the other hand a closure cover.

The open housing has a cross section the shape of which substantially matches the external shape of the assembly formed by the two devices connected together. The cover also has the shape of the cross section of the housing and is fastened onto the housing by welding.

The transmission device comprises several gear stages linked to each other, and in particular a planetary gear (which may comprise two stages) comprising at least one toothed ring gear with an internal toothing.

A brake motor gear unit is known from the document FR 3074757, comprising at least two epicyclic gear trains forming reduction stages mounted in series, enclosed in a housing or protective casing.

With the development of motor gear units, the manufacture of parts comprising these ring gears has had to change: they must henceforth be produced from metal and be mounted in the housing, instead of being moulded in the housing as was the case heretofore.

Typically, the housing has projecting ribs and the ring gear is force-fitted in the housing in order to be held there: by being compressed against the ring gear, it is thus the ribs that hold the ring gear or ring gears in position in the housing.

However, it has been noted that by force-fitting the parts into the housings, chips could become detached from the parts, which could have a detrimental effect on the rotational drive of the gears.

It has also been noted that by combining ribs and force-fitting, this solution could give rise to noise generation in the housing.

SUMMARY

The invention therefore aims to propose an alternative solution for ensuring that the ring gear is held within the housing, without producing chips in the housing, with the risk of damaging the gears or compromising their operation.

To this end, the invention relates to a cover for a motor gear unit for an electric actuator for a brake, in particular a disc brake, said motor gear unit comprising a housing enclosing an electric motor and a reduction gear mechanism mechanically connected to said electric motor to provide at the output of said reduction gear mechanism a rotational drive of a shaft along an output axis, said reduction gear mechanism comprising an epicyclic gear system comprising planet gears meshing with the inner surface of a toothed ring gear fixed in rotation, which is mounted in a recess of the housing and has a ring gear axis defining an axial direction, said housing having an opening for access to said recess, making it possible to axially insert said gear system therein or at least said toothed ring gear, said toothed ring gear having a free edge directed towards said access opening.

According to the invention, the cover is designed to close the access opening, and is noteworthy in that it comprises an axial projection, in particular an inner skirt, capable of being positioned at least partially bearing against the free edge of said ring gear when the cover closes said opening, said projection having on a free end opposite the free edge of the ring gear at least one elastically deformable element capable of at least partially bearing against the free edge of the ring gear, so as to hold said ring gear in the housing in said axial direction.

Produced in this way, the ring gear is held axially by the cover. It is then possible to assemble the ring gear into the housing with a free or sliding fit. Thus, the restrictions and disadvantages of force-fitting are avoided, in particular the need to use a press and the risk of chip formation.

According to an advantageous embodiment that will be presented hereinafter, the axial projection comprises an inner skirt that is elastically deformable and/or that comprises at least three deformable studs, projecting axially, which are distributed about the output axis, in particular with a gap between them of at least 60° or at least 80°.

In addition, said at least three projecting studs are equidistant or substantially equidistant from each other.

Furthermore, said elastically deformable element is over-moulded on the free end of said axial projection.

According to an advantageous embodiment envisaged by the invention, said axial projection is produced at least partially in a single piece with the cover.

According to a variant embodiment, said axial projection is mounted on said cover by assembly.

Furthermore, said axial projection forms an inner skirt which is produced from elastomer and at least partially constitutes said elastically deformable element.

The invention also relates to a motor gear unit for an electric actuator for a disc brake, said motor gear unit comprising a housing enclosing an electric motor and a reduction gear mechanism mechanically connected to said electric motor to provide at the output of said reduction gear mechanism a rotational drive of a shaft along an output axis, said reduction gear mechanism comprising a gear system with toothed wheels and a ring gear at least partially accommodating said gear system and having a ring gear axis defining an axial direction, said protective ring gear having a ring gear free edge, said housing having an opening for access to said gear system and to said ring gear. According to the invention, the motor gear unit is noteworthy in that it comprises a cover such as defined above, said cover closing said access opening.

According to an embodiment of the invention, the inner skirt of the cover (of the motor gear unit) has a cross section the shape of which is substantially the same as the shape of the cross section of the ring gear, so that the free edge of the ring gear is positioned opposite the free end of the inner skirt of the cover when the cover is positioned on the housing, in order to bear on the entire free edge of the ring gear.

Advantageously, said ring gear, the housing receiving said ring gear and said inner skirt of the cover are each at least partially cylindrical.

Also advantageously, the recess of the housing and the toothed ring gear interact with each other by cooperation of shape, in particular by mutually complementary reliefs formed around the ring gear to lock said ring gear in rotation in said recess of the housing.

Within the context of this embodiment, said ring gear comprises an outer surface that has at least one first projecting element, said housing comprising an inner surface having at least one second projecting element, said at least one first projecting element of said ring gear being capable of engaging with said at least one second projecting element of said housing.

The invention also relates to a vehicle brake, in particular a disc brake, comprising an electric motor gear unit such as defined above or a motor gear unit comprising a cover such as defined above, which drives an electric braking actuator, in particular for parking.

Finally, the invention relates to a method for assembling a cover such as defined above onto a housing access opening of a motor gear unit such as defined above.

According to the invention, the method is noteworthy in that it comprises the following steps:

positioning the ring gear in the recess of the housing via free or sliding fit (for example so that said at least one first projecting element engages with said at least one second projecting element of said housing).

positioning the cover on the housing, by applying said elastically deformable element against the free edge of said ring gear.

applying a pressure on the cover so that said axial projection exerts a pressure on the ring gear in the axial direction of the ring gear, and thus compressing the elastically deformable element or elements.

fastening the cover onto the housing, in particular by welding or bonding.

It should be noted that, even if the method provides for a free fit, the vibrations are avoided by virtue of the damping effect of the elastically deformable element or elements capable of at least partially bearing against the free edge of the ring gear, so as to hold said ring gear in the housing in said axial direction.

BRIEF DESCRIPTION OF THE DRAWINGS

Other advantages and characteristics of the invention will become apparent on examination of the detailed description of an embodiment that is in no way limitative, and from the attached drawings in which:

FIG. 1 is a perspective view of a motor gear unit according to the invention.

FIG. 2 is a perspective view of a cover for a motor gear unit according to the invention.

FIG. 3 is a perspective view of a cover and of a toothed ring gear that comprises the motor gear unit illustrated in [FIG. 1], and FIG. 4 is a partially exploded perspective view of a part of the motor gear unit shown in [FIG. 1], showing a cover according to the invention, positioned above planet gears meshing with the inner surface of the toothed ring gear should in [FIG. 3], the toothed ring gear being positioned below the planet gears in order to reveal them.

DETAILED DESCRIPTION

The terms "upper". "lower". "left". "right". "top". "bottom" etc. are used in the following description merely to allow the reader to find their bearings in the figures: it should be understood that these terms are not limitations of the invention.

A cover 1 forming the subject of the invention is shown alone in FIG. 2. In FIGS. 1, 3 and 4 respectively, it is mounted in a motor gear unit 2, where it is shown in association with a toothed ring gear 3 as positioned in the motor gear unit (FIG. 3) or in a position spaced apart from the toothed ring gear 3 (FIG. 4).

The cover 1 shown in the figures is designed to hold the ring gear 3 in position in the motor gear unit: it is therefore convenient firstly to show which are the elements comprised in the motor gear unit 2 and their arrangement, so as to identify the area of the motor gear unit 2 where the cover 1 according to the invention is implemented.

FIG. 1 shows the motor gear unit 2 in its entirety, the cover 1 being visible on the upper part of the motor gear unit 2.

The motor gear unit 2 is designed for a disc brake actuator, of the type comprising a movable calliper mounted sliding on a yoke, the actuator driving the calliper in displacement under the action of the motor gear unit or of a hydraulic piston.

FIG. 1 shows an example of such a motor gear unit and it is noted that it comprises a housing 4, forming a protective casing for the motor gear unit 2, the housing 4 having two parts:

an upper part 40, having substantially a bean-shaped cross section, accommodating two cylindrical shapes: a first cylindrical shape 41 located on the left in the upper part 40 in FIG. 1 and a second cylindrical shape 42 located on the right in the upper part 40 in FIG. 1.

a lower part 43, formed by the second cylindrical shape which is downwardly-projecting and which extends over a height substantially identical to the height of the upper part 40.

In reality, the lower part 43 extends the second cylindrical shape 42 downwards to accommodate an electric motor (not shown) of the motor gear unit 2.

The motor gear unit 2 also comprises a reduction gear mechanism 5 (see FIG. 3) the output 50 of which is visible and corresponds to the first cylindrical shape 41 in the lower part of the upper part 40 of the housing.

The reduction gear mechanism 5 is mechanically connected to the electric motor, by means of a gear 51 shown in particular in FIGS. 3 and 4, the pinion gears being located in the upper part of the part 40 of the cylindrical shape 42 of the housing 4.

The reduction gear mechanism 5 comprises an epicyclic gear system comprising planet gears visible particularly in FIG. 4, meshing with the inside of the toothed ring gear 3 (see FIG. 3) (the teeth of certain gears are engaged between the teeth of the inner surface of the toothed ring gear 3).

It should be noted that the toothed ring gear 3 is mounted fixed in rotation in the housing 4.

The ring gear 3 is mounted in a recess of the housing 4, being in the cylindrical shape 41 of the upper part 40 of the housing 4.

It is noted in FIG. 3 that the output 50 of the reduction gear mechanism has a shaft 52 that extends along an output axis A1.

The output axis A1 corresponds to the axis of the ring gear 3 and it defines an axial direction.

The shaft 52 makes it possible to control the actuator at the origin of the movement of the calliper of the piston of the disc brake (actuator and disc brake not shown), typically of the screw and nut type.

The upper part 40 of the housing 4 has an access opening that is closed by the cover 1 according to the invention.

The access opening makes it possible to introduce axially into the housing 4 at least the gear system 5 and the toothed ring gear 3.

The lower part 43 of the housing 4, which at least partially accommodates the electric motor 4, is also closed.

FIGS. 3 and 4 show that the ring gear 3 has a free edge 30 that is directed towards the access opening of the housing 4 (and therefore towards the cover 1 according to the invention closing the access opening).

The ring gear 3 is generally cylindrical in shape, having a toothed inner surface 31 and an outer surface 32 that has three elements 33 projecting radially outwards and each extending in a direction parallel to the axial direction A1, The projecting elements 33 are equidistant from each other.

The inside of the housing 4 that accommodates the ring gear 3 is cylindrical and comprises a housing inner surface that also has elements projecting inwards, these internal projecting elements engaging with the projecting elements 33 of the ring gear when it is accommodated in the housing 4: in this way, the ring gear 3 is locked in rotation in its accommodating recess of the housing 4 when it is located there.

Thus, the recess of the housing 4 and the toothed ring gear 3 interact with each other by cooperation of shape, in particular by mutually complementary reliefs formed in particular around the ring gear 3 (projecting elements of the inside of the housing and those of the outer surface of the ring gear 3).

Reference will now be made more particularly to the cover 1 according to the invention.

The cover 1 comprises a bottom wall 10 and a peripheral skirt 11, bordering the bottom wall 10, in line with the outer wall of the housing 4 when the cover 1 is put in place and fastened by welding onto the housing 4.

The bottom wall 10 comprises projecting elements forming a honeycomb structure 12 (see FIG. 2), which has the function of limiting the vibrations of the cover 1 (the bottom wall 10 behaving as a vibrating skin).

The cover 1 has a shape similar to the shape of the cross section of the housing 4.

According to the invention, the cover 1 also comprises an axial projection (i.e, the axis of which is merged with the axis A1 when the cover is positioned on the access opening of the housing 4).

Within the context of the example illustrated in the figures, the axial projection is an inner skirt 13, which is positioned at least partially bearing against the free edge 30 of the ring gear 3 when the cover 1 closes the access opening of the housing 4 (see FIG. 3).

The inner skirt 13 (or axial projection) has a free end 14 opposite the free edge 30 of the ring gear 3. On this free end 14, the ring gear has at least one elastically deformable element 15, which within the context of the example illustrated, is produced by eight elastically deformable studs 15.

The eight studs 15 are in axial projection from the free end 14 of the inner skirt 13 and bear against the free edge 30 of the ring gear 3 (see FIG. 3) in order to hold the ring gear 3 in the housing 4 in the axial direction A1.

As the ring gear 3 is thus held axially by the cover 1 and it is possible to assemble the ring gear 3 in the housing via free or sliding fit: the restrictions and disadvantages of force-fitting provided in the aforementioned state of the art are thus avoided, in particular the need to use a press and the risk of chip formation that could have a detrimental effect on the correct operation of the motor gear unit.

The inner skirt 13 is at least partially cylindrical and the eight studs 15 are advantageously distributed equidistantly or equiangularly about the output axis A1.

It must be understood that the invention is not limited to the presence of eight studs and that more or fewer could be provided.

Within the context of another embodiment, provision could be made for at least three studs distributed about the axis A1, in particular with a gap between them of at least 60°, or at least 80°.

The shape of the inner skirt 13 is at least partially cylindrical and has a cross section the shape of which is substantially the same as the shape of the cross section of the ring gear 3, so that the free edge 30 of the ring gear 3 is positioned opposite the free end 14 (the rim) of the inner skirt 13 of the cover 1 when the cover 1 is positioned on the housing 4, in order to bear on the entire free edge 30 of the ring gear 3.

In a variant, the skirt 13 is elastically deformable with the studs 15: it is for example produced from elastomer and would at least partially constitute the elastically deformable element or elements according to the invention.

In a variant, without exceeding the scope of the invention, the studs are overmoulded on the free end 14 of the inner skirt 13.

In a variant the elastically deformable element is overmoulded on the free end of the axial projections, i.e, the free end of the studs 15, without exceeding the scope of the invention.

The axial projection(s), or stud(s) 15, are:

either produced in a single piece with the skirt 13.

or produced on the free end 14 of the cover by being mounted on this free end.

FIGS. 2 and 3 also show that the cover has furthermore a second inner skirt 16, formed by the partial contour of two interlaced rings. The second inner skirt 16 is positioned for example around gears situated in the upper part of the housing, in particular the gear 51 in the example illustrated in the figures.

Reference will now be made to a method for the assembly of the cover 1 onto the housing 4 of the motor gear unit 2.

Firstly, the ring gear 3 is positioned in the recess of the housing 4 via free or sliding fit.

Then, the cover 1 is positioned on the housing 4, by applying the elastically deformable elements 15 against the free edge 30 of said ring gear 3.

A pressure is then applied on the cover 1 so that said axial projection (free end of the inner skirt) 14 exerts a pressure on the ring gear 3 in the axial direction A1 of the ring gear and thus compresses the elastically deformable stud or studs 15.

Finally, the cover 1 is fastened onto the housing 4, in particular by welding or by bonding.

It is understood from the preceding description how the invention makes it possible to hold the ring gear 3 in place in the housing 4 of a motor gear unit 2 without force-fitting.

It must be understood that the invention is not limited to the embodiment specifically shown in the figures and described above. The invention extends to the implementation of equivalent means and to the embodiment of a brake (not shown), such as a vehicle disc brake comprising an electric motor gear unit such as described above (for example) that would comprise a cover such as the one shown and described above, or comprising equivalent characteristics. In such a theoretical case, the vehicle brake according to the invention is designed to drive an electric braking actuator, in particular for parking.

7

REFERENCE SIGNS

1—cover
2—motor gear unit
3—toothed ring gear
4—housing
5—reduction gear mechanism
10—bottom wall
11—peripheral skirt bordering the bottom wall
12—honeycomb structure
13—inner skirt
14—free end of the inner skirt
15—elastically deformable element
16—second inner skirt
30—free edge of the ring gear
31—toothed inner surface
32—outer surface
33—projecting elements
40—upper part of the housing
41—first cylindrical shape
42—second cylindrical shape
43—lower part
50—output of the reduction gear mechanism
51—output gear of the motor shaft
52—output shaft of the reduction gear mechanism
A1—output axis/axial direction

The invention claimed is:

1. A cover for a motor gear unit for an electric actuator for a brake, comprising; said motor gear unit including a housing enclosing an electric motor and a reduction gear mechanism mechanically connected to said electric motor to provide at the output of said reduction gear mechanism a rotational drive of a shaft along an output axis;

said reduction gear mechanism comprising an epicyclic gear system comprising planet gears meshing with the inner surface of a toothed ring gear fixed in rotation, which is mounted in a recess of the housing and has a ring gear axis defining an axial direction;

said housing having an opening for access to said recess, making it possible to axially insert said gear system therein or at least said toothed ring gear;

said toothed ring gear having a free edge directed towards said access opening;

said cover being designed to close the access opening, and comprising an axial projection capable of being positioned at least partially bearing against the free edge of said ring gear when the cover closes said opening; and said projection having on a free end opposite the free edge of the ring gear at least one elastically deformable element capable of at least partially bearing against said free edge of the ring gear, so as to hold said ring gear in the housing in said axial direction.

2. The cover according to claim 1, characterized in that said axial projection comprises an inner skirt that is elastically deformable and/or that comprises at least three axially projecting elastically deformable studs that are distributed about the output axis, in particular with a gap between them of at least 60°.

3. The cover according to claim 2, characterized in that said at least three projecting studs are substantially equidistant from each other.

4. The cover according to claim 1, characterized in that said elastically deformable element is overmoulded on the free end of said axial projection.

5. The cover according to claim 1, characterized in that said axial projection is produced at least partially in a single piece with the cover.

6. The cover according to claim 1, characterized in that said axial projection is mounted on said cover by assembly.

7. The cover according to claim 6, characterized in that said axial projection forms an inner skirt that is produced from elastomer and that at least partially constitutes said elastically deformable element.

8. A motor gear unit for an electric actuator for a disc brake, said motor gear unit comprising a housing enclosing an electric motor and a reduction gear mechanism mechanically connected to said electric motor to provide at the output of said reduction gear mechanism a rotational drive of a shaft along an output axis;

said reduction gear mechanism comprising a pinion gear system and a toothed ring gear at least partially accommodating said gear system and having a ring gear axis defining an axial direction, said toothed ring gear having a free edge of the ring gear, said housing having an access opening to said gear system and to said ring gear including a cover according to claim 1, said cover closing said access opening.

9. The motor gear unit according to claim 8, characterized in that the inner skirt of the cover has a cross section the shape of which is substantially the same as the shape of the cross section of the ring gear, so that the free edge of the ring gear is positioned opposite the free end of the inner skirt of the cover when the cover is positioned on the housing, in order to bear on the entire free edge of the ring gear.

10. The motor gear unit according to claim 8, characterized in that said ring gear, the housing receiving said ring gear and said inner skirt of the cover are each at least partially cylindrical.

11. The motor gear unit according to claim 10, wherein the recess of the housing and the toothed ring gear interact with each other by cooperation of shape formed around the ring gear to lock said ring gear in rotation in said recess of the housing.

12. A vehicle brake, comprising an electric motor gear unit according to claim 8, which drives an electric braking actuator, in particular for parking.

13. A method for assembling a cover according to claim 1, onto an access opening of a housing of a motor gear unit, said method having the following steps:

positioning the ring gear in thea recess of the housing via free or sliding fit;

positioning the cover on the housing, by applying said elastically deformable element against the free edge of said ring gear;

applying a pressure on the cover so that said axial projection exerts a pressure on the ring gear in the axial direction (A1) of the ring gear; and fastening the cover onto the housing, in particular by welding or bonding.

14. The method of claim 13, wherein said motor gear unit is configured according to claim 8.

* * * * *